United States Patent [19]

Kashiwada et al.

[11] Patent Number: 5,747,572
[45] Date of Patent: May 5, 1998

[54] RELEASABLE AQUEOUS COATING COMPOSITION AND METHOD OF TEMPORARILY PROTECTING FINISHED COATING FILM ON AUTOMOBILE BODY BY USE OF THE SAME

[75] Inventors: Seiji Kashiwada; Shouji Takahashi; Hiroshi Inoue; Kenya Suzuki; Hiromi Harakawa; Fumiaki Nakao, all of Hiratsuka, Japan

[73] Assignee: Kansai Paint Co., Ltd., Hyogo-ken, Japan

[21] Appl. No.: 750,598

[22] PCT Filed: Apr. 26, 1996

[86] PCT No.: PCT/JP96/01167

§ 371 Date: Dec. 19, 1996

§ 102(e) Date: Dec. 19, 1996

[87] PCT Pub. No.: WO96/36671

PCT Pub. Date: Nov. 21, 1996

[30] Foreign Application Priority Data

May 19, 1995 [JP] Japan ................................. 7-144255

[51] Int. Cl.⁶ .................................................. C08K 5/54
[52] U.S. Cl. ............................ 524/265; 524/276; 524/556
[58] Field of Search ................................ 524/556, 265

[56] References Cited

U.S. PATENT DOCUMENTS

| 4,210,565 | 7/1980 | Emmons | 524/556 |
| 4,952,623 | 8/1990 | Auchter | 524/517 |
| 4,988,762 | 1/1991 | Overbeek | 524/839 |
| 5,147,926 | 9/1992 | Meichsner | 524/591 |
| 5,208,282 | 5/1993 | Rehmer | 524/369 |
| 5,571,862 | 11/1996 | Klein | 524/591 |
| 5,596,035 | 1/1997 | Desor | 524/555 |
| 5,623,016 | 4/1997 | Klein | 524/591 |

FOREIGN PATENT DOCUMENTS

| 5-59305 | 3/1993 | Japan . |
| 6-207125 | 7/1994 | Japan . |
| 7-102208 | 4/1995 | Japan . |
| 7-247460 | 9/1995 | Japan . |

Primary Examiner—Paul R. Michl
Attorney, Agent, or Firm—Fisher, Christen & Sabol

[57] ABSTRACT

The present invention relates to a releasable aqueous coating composition containing (A) a resin dispersion containing a carbonyl group-containing copolymer aqueous dispersion and a polyhydrazide compound in such a ratio that an amount of hydrazide group is in the range of 0.02 to 3.0 equivalents per one equivalent of carbonyl group in the emulsion particle, and (B) a release assistant; and a method of temporarily protecting a finished coating film of an automobile body, which method comprises coating said coating composition onto a surface of a finished cured coating film coated onto the automobile body.

14 Claims, 3 Drawing Sheets

RELEASABLE AQUEOUS COATING COMPOSITION AND METHOD OF TEMPORARILY PROTECTING FINISHED COATING FILM ON AUTOMOBILE BODY BY USE OF THE SAME

FIELD OF THE INVENTION

The present invention relates to a releasable aqueous coating composition useful for temporarily protecting a finished coating film on an automobile body and surfaces of other coated products, and to a method of temporarily protecting the finished coating film on the automobile body by use of the coating composition.

BACKGROUND ART

It has widely been carried out to temporarily protect a finished coating film on a product, a surface of which has been coat-finished, for example, a metal product, woodworking product, glass product, plastic product, rubber product or the like as in an automobile, vehicle, mechanical part, domestic article or the like.

For example, developments of scuffs on the finished coating film due to contact with other objects, or of marks, stains, discoloration, pollution and the like due to clouds of sand in air, iron powder, salts, smoking, droppings of birds, humores or carcasses of insects, sunlight, wind and rain, particularly acid rain, and the like during storage in an outdoor stock yard, or during transportation by cars, railways, trailers, ships and the like in such a period of time as from completion to passing into the possession of users of these coat-finished products, reduce commercial values of the coat-finished products. In order to prevent the above reduction in commercial values, the finished coating film is temporarily protected during such a period of time as from completion to passing into the possession of users of the coat-finished product. The following methods ① to ⑤ of temporarily protecting the coat-finished product are known in the art, all being unsatisfactory.

① An aliphatic hydrocarbon based solvent dispersion of waxes is coated. An emulsion prepared by dispersing a cleaning agent into a hydrocarbon solvent or water is used in removing a temporarily coated film. However, the application of the above emulsion to the automobile, for example, results in that anticorrosive agents and anticorrosive waxes coated onto interior parts of doors and hinge parts are simultaneously removed, too, and further that the use of the solvent may cause smelling of the finished coating film, and environmental problems such as danger of fire, waste water treatment and the like.

② Such a wax-solid powder organic solvent dispersion is coated that the wax is mixed with the solid powder so that strength of a wax film may be reduced and a protecting film may easily be removable by hand-wiping.

The above method has such drawbacks that the protecting film shows poor properties in the temporarily protecting properties, may easily drop by contact with hands, and may easily be polluted by the acid rain.

③ It is known in the art to use an emulsion containing, as a major component, acrylic resin as an aqueous, temporarily protecting agent. Since the above emulsions contain carboxyl group-containing monomers such as acrylic acid, methacrylic acid and the like in a large amount, a resulting film is difficult to be removed and is removed by use of an aqueous alkaline solution, resulting in needing considerable manhours, and in causing problems of waste water disposal etc.

④ For example, the use of an acrylic resin emulsion containing (meth)acrylonitrile as an aqueous, temporarily protecting agent is disclosed in Japanese Patent Application Laid-Open No.259966/91, and a resulting film shows excellent properties in film strength and release properties, but has difficulties in waste disposal of a released film because of containing (meth)acrylonitrile. For example, burying of the released film may cause water pollution, and incineration of the released film may generate hydrogen cyanide gas, resulting atmospheric pollution.

⑤ For example, the use of a coating composition containing, as a major component, a vinyl acetate emulsion as an aqueous protecting agent is disclosed, in U.S. Pat. No. 5,143,949, but the resulting film shows poor properties in acid resistance, water resistance and the like.

On the other hand, a method of coating the above aqueous, temporarily protecting agents onto the finished coating film on the automobile body to form a protecting film may include ones disclosed in, for example, Japanese Patent Application Laid-Open Nos.80397/95, 80398/95 and 80399/95. More specifically, the above method may include a method which comprises washing the finished coating film with water, followed by subjecting the washing water to hydro-extraction, coating the temporarily protecting agent, and drying to form a protecting film, and a method which comprises coating the temporarily protecting agent onto the finished coating film on the automobile body after a body coating step and before an assembly step in an automobile production process, followed by drying to form a protecting film. However, application of the above temporarily protecting agents to the above methods results various problems such as development of sags during the step of coating the temporarily protecting agent, development of crack-like abnormal appearance on the protecting film on drying, and high temperature dependence on the strength and elongation of the protecting film.

As above described, in the case where the temporarily protecting agent is used, it is important to use a composition having the following properties (a)–(g).

(a) A resulting film shows a moderate adhesive properties to a finished coating film to be protected and is releasable as a continuous sheet by hands or high pressure water stream without damaging the finished coating film on releasing.

(b) The composition may be coated by spray coating, roller coating and brushing.

(c) A resulting film has excellent protecting functions, for example, prevention of stain and pollution due to acid rain, iron powder and the like, prevention of damages due to contact with other object and chipping, and the like.

(d) A resulting film has moderate properties in elasticity, strength, elongation and durability, and shows low temperature dependence on properties such as strength and elongation. That is, in the case where the protecting film is released outdoors, the resulting film may not produce such problems that elongation of the protecting film is so increased during the high temperature summer season as to make releasing impossible, and that elongation of the protecting film is so reduced during the low temperature winter season as to develop cracks on the protecting film, resulting in making releasing impossible.

(e) A resulting film has properties necessary for outdoor storage in water resistance, weather resistance, and thermal stability.

(f) The composition does not contain additives such as solvent, plasticizer, dispersing agent and the like, which may cause swelling of the finished coating film, and defects on the surface of the finished coating film, for example, deformation, stain, hazy gloss and the like. (g) Since a released film is discarded by burying or incineration, the released film contains none of any components harmful to human body and environment.

For the purpose of solving the above problems ① to ⑤ and of developing a temporarily protecting, releasable aqueous coating composition having above properties (a) to (g), the present inventors made intensive studies and found out that the use of a releasable aqueous coating composition containing a specified crosslinkable emulsion resin and a release assistant makes it possible to form a protecting film, which has high film strength and moderate elongation, the strength and elongation of which do not vary largely depending on the film temperature, which is easily releasable after use for a long period of time, which has excellent properties in protective functions to acid rain and the like, and which is free of environmental problems on burying and incineration after releasing, resulting in making it possible to temporarily protect the finished coating film and in accomplishing the present invention.

DISCLOSURE OF THE INVENTION

The present invention relates to a releasable aqueous coating composition containing (A) a resin dispersion containing a carbonyl group-containing copolymer aqueous emulsion preferably containing, as a monomer component, a carbonyl group-containing α,β-ethylenically unsaturated monomer in an amount of 0.1 to 30% by weight based on a monomer composition and a polyhydrazide compound containing at least two hydrazide groups in one molecule as a crosslinking agent in such a ratio that an amount of hydrazide group is in the range of 0.02 to 3.0 equivalents per one equivalent of carbonyl group in the emulsion particle, and (B) a release assistant; and a method of temporarily protecting a finished coating film on an automobile body, which method comprises coating said releasable aqueous coating composition onto a surface of a finished cured coating film coated onto the automobile body.

PREFERRED EMBODIMENT OF THE INVENTION

Figure 1:
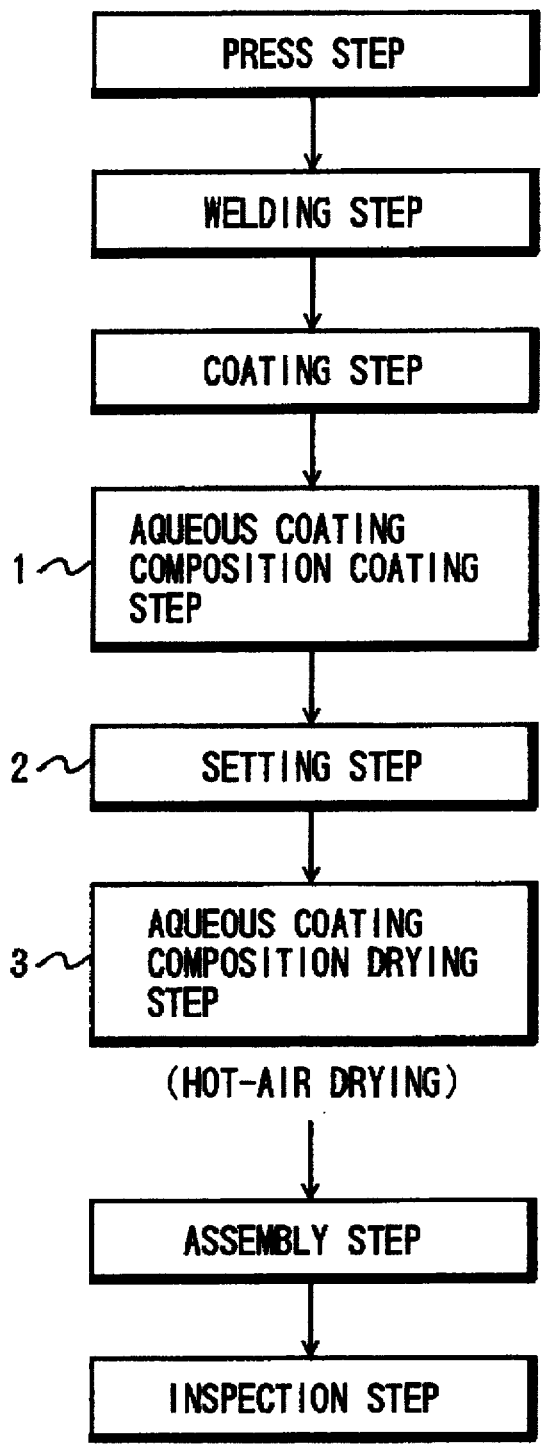
FIGS. 1-3 show flow charts for explaining an example of the method of the present invention.

The coating composition of the present invention is characterized in that the coating composition contains, as a major component, a resin dispersion which is crosslinkable by reaction between a carbonyl group-containing copolymer emulsion and a polyhydrazide compound, so that a strong, three dimensionally crosslinked film may rapidly be formed, in that a coated film obtained therefrom has high strength and moderate elongation, and in that the strength and elongation show low dependence on temperature.

The resin dispersion (A) in the coating composition of the present invention contains a carbonyl group-containing copolymer aqueous emulsion and a polyhydrazide compound as the essential components.

The copolymer aqueous emulsion may include any stable copolymer aqueous emulsion, preferably may include one containing a carbonyl group-containing α,β-ethylenically unsaturated monomer (a) in an amount of 0.1 to 30% by weight based on a monomer composition as a monomer component of the copolymer constituting the emulsion particle.

The above stable copolymer aqueous emulsion may be prepared, for example, by subjecting a monomer mixture consisting of 0.1 to 30% by weight of the carbonyl group-containing α,β-ethylenically unsaturated monomer (a), 0 to 10% by weight of a water-soluble ethylenically unsaturated monomer (b) copolymerizable with the monomer (a) and 60 to 99.9% by weight of an ethylenically unsaturated monomer (c) other than both monomer (a) and monomer (b) and copolymerizable with the monomer (a) and monomer (b) to emulsion polymerization in the presence of an emulsifier.

Examples of the above monomer (a) may include acrolein, diacetone acrylamide, diacetone methacrylamide, formylstyrol, vinyl alkyl ketone having 4 to 7 carbon atoms, for example, vinyl methyl ketone, vinyl ethyl ketone, vinyl butyl ketone and the like, and the like. Of these, diacetone acrylamide and diacetone methacrylamide are the most preferred.

The monomer (b) is copolymerizable with the monomer (a) and is a monomer which shows strong hydrophilic properties as it is, or by neutralization or as a quaternary salt, and may include anionic ones, cationic ones and nonionic ones.

The monomer (b) is used for the purpose of imparting hydrophilic properties to the copolymer emulsion, and stability of the emulsion is thereby increased.

Typical examples of the monomer (b) may include anionic ones such as acrylic acid, methacrylic acid, maleic acid, crotonic acid, β-carboxyethylacrylate, 2-acrylamide-2-methylpropane sulfonic acid, alkylsulfonic acid, sodium styrene sulfonate, sulfoethyl methacrylate, sodium salt or ammonium salt thereof; cationic ones such as dimethylaminoethylacrylate, dimethylaminoethylmethacrylate, acrylamide, methacrylamide, dimethylaminopropyl acrylamide, dimethylaminopropyl methacrylamide, adducts of glycidyl (meth)acrylate with amines, and the like; nonionic ones such as (meth)acrylate having a polyoxyethylene chain, and the like.

The monomer (c) may include any ethylenically unsaturated monomer, which is copolymerizable with the monomer (a) and the monomer (b) and is other than the monomers (a) and (b).

Typical examples of the monomer (c) may include $C_1$–$C_{24}$ alkyl or cycloalkyl ester of (meth)acrylic acid, for example, methylacrylate, ethylacrylate, propylacrylate, butylacrylate, hexylacrylate, cyclohexylacrylate, 2-ethylhexylacrylate, octylacrylate, laurylacrylate, stearylacrylate, methylmethacrylate, ethylmethacrylate, propylmethacrylate, isopropylmethacrylate, butylmethacrylate, hexylmethacrylate, cyclohexylmethacrylate, 2-ethylhexylmethacrylate, octylmethacrylate, laurylmethacrylate, stearylmethacrylate, and the like; $C_1$–$C_{16}$ alkoxyalkylester of (meth)acrylic acid, for example, methoxybutylacrylate, methoxybutylmethacrylate, methoxyethylacrylate, methoxyethylmethacrylate, ethoxybutylacrylate, ethoxybutylmethacrylate and the like; $C_2$–$C_8$ hydroxyalkylester of (meth)acrylic acid, for example, hydroxyethylacrylate, hydroxyethylmethacrylate, hydroxypropylacrylate, hydroxypropylmethacrylate, and the like; aromatic unsaturated monomers such as styrene, vinyltoluene, α-methylstyrene, N-vinylpyrrolidone, vinylpyridine and the like; olefines such as ethylene, propylene, butylene, pentene and the like; diene compounds such as butadiene, isoprene, chloroprene and the like; vinyl propionate, vinyl acetate, vinyl pivalate, VEOVA monomer (Trade name, marketed by Shell Chemical Co., Ltd.) and the like. These monomers may be used depending on respective properties.

Of these monomers, U.S. Pat. No. 4,267,091 and EP Publication No.5167, for example, discloses a crosslinkable emulsion resin by use of methylmethacrylate, styrene, vinylacetate.

However, for the purpose of ensuring protecting performance to acid rain etc. and good releasability with time according to the object of the present invention, in the present invention, vinyl acetate is not preferred from the standpoint of preventing reduction in acid resistance and water resistance, and styrene is not preferred from the standpoint of preventing reduction in releasability with time. In the present invention, the monomer (c) particularly include ethylmethacrylate, propylmethacrylate, butylmethacrylate and the like.

Amounts of the monomers (a), (b) and (c) based on a total amount of the monomers (a), (b) and (c) are as follows respectively.

monomer (a): 0.1 to 30% by weight, preferably 2 to 15% by weight monomer (b): 0 to 10% by weight, preferably 0 to 3% by weight monomer (c): 60 to 99.9% by weight, preferably 82 to 98% by weight When the amount of the monomer (a) is less than 0.1% by weight, a number of crosslinking sites to the polyhydrazide compound as the crosslinking agent is too few to satisfactorily carry out crosslinking, and the coated film shows unsatisfactory strength. On the other hand, when the amount of the monomer (a) is more than 30% by weight, a resulting coating composition shows poor storage stability. An increased amount of the monomer (b) makes strong hydrophilic properties of the resulting emulsion resin, resulting in that the resulting coated film may show poor water resistance. Therefore, the amount of the monomer (b) is preferably in the range of 10% by weight or less. Particularly, in the case where carboxyl group-containing monomer and amide group-containing monomer are used, an increased amount thereof may increase adhesion to a finished coating to be protected and makes difficult releasing of the protecting film, the amount of the monomer being preferably 0.5% by weight or less.

The copolymer aqueous emulsion of the present invention may be prepared by the known process, for example, may be easily prepared by subjecting the above monomer components to emulsion polymerization in the presence of an emulsifier. The above emulsifier may include nonionic surfactant, anionic surfactant, reactive surfactant having copolymerizable unsaturated group and the like. That is, the copolymer aqueous emulsion may be prepared by carrying out emulsion polymerization by use of a polymerization initiator in the presence of at least one of the above emulsifiers. In addition to the above emulsion polymerization, the copolymer aqueous emulsion may also be prepared by the known suspension polymerization.

The crosslinking agent used in the composition of the present invention is a polyhydrazide compound having at least two of hydrazide group:

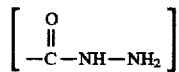

which is reactable with carbonyl group in the copolymer aqueous emulsion particle, in one molecule.

Specific examples of the above polyhydrazide compound may include saturated aliphatic carboxylic acid dihydrazide having 2 to 18 carbon atoms, for example, oxalic acid dihydrazide, malonic acid dihydrazide, succinic acid dihydrazide, glutaric acid dihydrazide, adipic acid dihydrazide, sebacic acid dihydrazide; monoolefin unsaturated dicarboxylic acid dihydrazide such as maleic acid dihydrazide, fumaric acid dihydrazide, itaconic acid dihydrazide; carbonic acid polyhydrazide such as carbonic acid drihydrazide and a compound represented by the general formula:

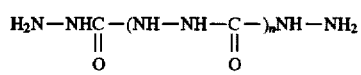

where n represents an integer of 1 to 5, preferably 1 to 3; bissemicarbazide, particularly aliphatic, alicyclic or aromatic bissemicarbazide represented by the general formula:

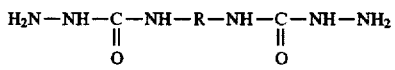

where —R— group represents a bivalent straight-chain or branched chain aliphatic residual group having 2 to 7 carbon atoms or carbocyclic residual group having 6 to 8 carbon atoms, for example, O-, m- or p-phenylene group, tolylene group, cyclohexylene group or methylcyclohexylene group; aromatic polycarboxylic acid polyhydrazide, for example, phthalic acid, terephthalic acid or isophthalic acid dihydrazide, and pyromellitic acid dihydrazide, trihydrazide or tetrahydrazide; aliphatic trihydrazide such as nitrilotriacetic acid trihydrazide; aliphatic tetrahydrazide such as ethylenediaminetetraacetic acid tetrahydrazide; polyhydrazide prepared by reacting a lower polymer having carboxylic acid lower alkyl ester group with hydrazide or hydrazide hydrate (hydrazine hydrate) (see Japanese Patent Publication No.22878/77); carbohydrazide, 1,3-bis (hydrazinocarboethyl)-5-isopropylhydantoin and the like.

Since too high hydrophobic properties of the polyhydrazide compound makes water dispersion difficult and makes it impossible to obtain a uniform crosslinked film, the polyhydrazide compound having a relatively lower molecular weight (about 300 or less) and moderate hydrophilic properties is preferred. Preferable and typical examples thereof may include $C_4$-$C_{12}$ dicarboxylic acid dihydrazide compounds such as succinic acid dihydrazide, glutaric acid dihydrazide, adipic acid dihydrazide, sebacic acid dihydrazide and the like.

A crosslinking reaction between carbonyl group and hydrazide group on curing the composition of the present invention may take place according to the following equation;

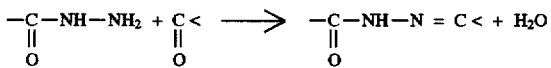

An amount of the polyhydrazide compound used as the crosslinking agent in the composition of the present invention is such that an amount of hydrazide group is in the range of 0.02 to 3.0 equivalents, preferably 0.1 to 2.0 equivalents per one equivalent of carbonyl group contained in the particle of the copolymer aqueous emulsion.

A vehicle component in the composition of the present invention consists of a solid content of the resin dispersion (A) containing the carbonyl group-containing copolymer aqueous emulsion and the polyhydrazide compound.

The resin dispersion (A) may consist of the copolymer aqueous emulsion and the polyhydrazide compound only, and may also consist of ones prepared by adding to both copolymer aqueous emulsion and polyhydragide compound a known emulsion, which has conventionally been used in the field of the coating composition and does not produce an inter-particle crosslinking, for example, vinyl acetate emulsion, acrylic resin emulsion, vinyl acetate-acrylic resin emulsion, ethylene-vinyl acetate resin emulsion, etc. in an amount of 50% by weight or less based on a solid content in all of the vehicle components.

The composition of the present invention is prepared by adding the release assistant (B) to the above resin dispersion (A).

Use of the release assistant (B) in combination with the resin dispersion (A) makes it possible to maintain such functions that the releasable film formed from the above lower releasable aqueous coating composition has a moderate adhesion onto the surface of the finished coating film to be protected, and may completely be releasable without damaging the finished coating film on releasing, for a remarkably long period of time, i.e., three to five times longer period of time. The release assistant may preferably include at least one compound selected from wax series, silicone series, fluorocarbon series and the like. These compounds may be in the state of being dissolved or dispersed in water, or powdered.

Specific examples of the wax may include vegetable series such as candelilla wax, carnauba wax, rice wax, Japan wax, jojoba oil and the like; animal series such as bees wax, lanolin, spermaceli and the like; mineral series such as montan wax, ozocerite, ceresine and the like; petroleum seris such as paraffin wax, microcrystalline wax, petrolatum and the like; synthetic hydrocarbon series such as Fischer. Tropsch wax, polyethylene oxide wax, polyethylene wax, acrylic-ethylene copolymer wax and the like; modified wax series such as montan wax derivatives, paraffin wax derivatives, microcrystalline wax derivatives and the like; hydrogenated wax such as hardened castor oil, hardened castor oil derivatives and the like; other waxes such as 12-hydroxystearic acid, stearic amide, anhydrous phthalic imide, bisamide, amide, glycerine ester, sorbitane ester, $C_{12}$ or more, preferably $C_{18}$ or more higher alcohols, $C_{12}$ or more, preferably $C_{18}$ or more higher fatty acids, and the like.

The above wax series desirably have a melting point of about 15 to 250° C., preferably about 20° to 180° C. When the melting point is outside the above range, the releasable film may show poor properties in water resistance, acid resistance and the like.

The silicone series compounds may include ones having siloxane bond as backbone, for example, silicone oil, silicone powder, silicone emulsion, silicone water-soluble resin and the like. Specific examples thereof may include dimethyl polysiloxane series, methylphenyl polysiloxane series, cyclic dimethyl polysiloxane series, fluoropolysiloxane series, modified ones by amino, epoxy, polyether, alcohol, fluoro, mercapto, carboxyl, alkyl higher fatty acids respectively, for example, ones marketed by TORAY DOW CORNING SILICONE Co., Ltd. under the following trade names, silicone oil such as SH203, BY16-828, SF8411, SF8418, BY16-838, SF8422, BY16-848, SH3771, SH3746, SF8419 and FS1265; silicone powder such as R900, R901, R902, F100, F101, F200, F201, F202, F203, F400, F300, F301, F250, E500, E501, E600, E601, E602, E603 and E850; silicone emulsion such as SH204, SH490, SH7024, SH7028, SH7036 and SH7060; silicone aqueous resin such as SH3746, SH3749 and SH3771, and the like. The above silicone powder may have a mean particle size of usually about 0.1 to 100 μm, preferably about 5 to 50 μm.

Of these, the polyether-modified silicone oil having a molecular weight of 1000 to 20000 and represented by the following formula:

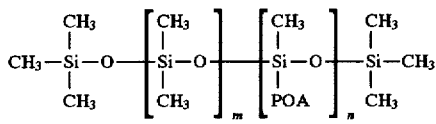

where m and n are a positive integer, POA represents polyether moiety due to ethylene oxide or propylene oxide modification, is the most prefered in that the polyether-modified silicone oil is hardly soluble in water, may easily form a water dispersion by use of a small amount of surface active agent, and may sufficiently be oriented in a lower layer portion of the releasable film, resulting in showing excellent properties in such functions as to lighten an adhesion increase caused in an interface between the finished coating film and the releasable film.

The fluorocarbon compound may preferably include ones containing fluoroalkyl group in the molecule and having a molecular weight of about 1,000 to 20,000, and may specifically include perfluoroalkyl carboxylate, perfluoroalkyl phosphate, perfluoroalkyl trimethylammonium salt, perfluoroalkyl pentanone, perfluoroalkyl ethylene oxide adduct and the like. Examples of trade names thereof (marketed by Asahi Glass Co., Ltd.) may include SURFLON S-111, S-112, S-113, S-121, S-131, S-132, S-142, S-145, 131S, 145S and the like.

Of these release assistants (B), the use of wax series and silicone compound has such advantages that a releasable film having excellent properties in water resistance and acid resistance may be obtained.

An amount of the release assistant (B) used may desirably be in the range of about 0.5 to 10 parts by weight, preferably about 1 to 5 parts by weight of the wax, about 0.01 to 10 parts by weight, preferably 0.1 to 5 parts by weight of the silicone compound, and about 0.01 to 5 parts by weight, preferably about 0.01 to 3 parts by weight of the fluorocarbon compound, per 100 parts by weight of the solid content in the resin dispersion (A).

The releasable aqueous coating composition of the present invention contains, as the essential components, the resin dispersion (A) and the release assistant (B), and, if needed, may contain a weather-resistant assistant (C) containing an ultraviolet light absorber and/or a light stabilizer and a pigment (D), particularly a titanium white.

In the case where the resin dispersion (A) and the release assistant (B) only are used, an outdoor exposure of several months or more extremely reduces elongation of the releasable film due to photo-deterioration, and causes the releasable film to adhere onto the finished coating film on the automobile body due to photo-oxidation so as to reduce releasability, resulting in that the releasable film may easily be torn to pieces on releasing, and that considerable manpowers may be needed on releasing. Therefore, it is an object of using the weather-resistant assistant (C) containing the ultraviolet light absorber and/or the light stabilizer to prevent the above photo-deterioration of the releasable film, and to provide good releasability after protection for a long period of time. The ultraviolet light absorber and the light stabilizer may be used alone respectively or in combination.

The ultraviolet light absorber may include ones known in the art. Specific examples thereof may include salicylic acid derivatives such as phenyl salicylate, p-octylphenyl salicylate, 4-tert-butylphenyl salicylate and the like; benzophenone series such as 2,4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2'-,4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, 2,2'-dihydroxy-4(3-methacryloxy-2-hydroxypropoxy) benzophenone and the like; benzotriazole series such as 2-(2'-hydroxy-5'-methylphenyl)benzotriazole and the like; other compounds such as oxalic anilide, cyanoacrylate and the like, and the like.

The light stabilizer may include ones known in the art, for example, hindered amine based light stabilizers and the like. Specific examples may preferably include bis (2,2',6,6'-tetramethyl-4-piperidinyl)-sebacate, 4-benzoyloxy-2,2',6,6'-tetramethylpiperidine and the like.

An amount of the component (C) may optionally be selected depending on objects, but may be such that the ultraviolet light absorber is in the range of 0.1 to 10 parts by weight, preferably 0.5 to 5 parts by weight, and the light stabilizer is in the range of 0.1 to 5 parts by weight, preferably 0.3 to 3 parts by weight per 100 parts by weight of the resin solid content in the resin dispersion (A) respectively.

Addition of the pigment (D), particularly titanium white in the form of a water dispersion to the composition of the present invention makes it possible to obtain a whitened releasable film, and the whitening results in making it possible to increase a barrier effect against ultraviolet light, heat and the like, and to improve releasability with time. Moreover, addition of the titanium white makes it possible to relax a shrinkage stress developing on the releasable film. This is effective to prevent the following troubles from being produced. That is, troubles are such that exposure of the releasable film at low temperatures in a wet state due to rain or snow particularly during the winter season causes to develop strong stress on the releasable film, and to develop lifting or peeling on an edge face of the coated releasable film, resulting in that the releasable film may naturally be peeled off due to strong wind or the like.

Examples of the pigment (D) may include color pigments such as titanium white, carbon black, phthalocyanine blue, phthalocyanine green and the like, extender pigments such as talc, calcium carbonate, silica, barium sulfate, clay, mica and the like, and the like. These may be used alone or in combination. Of these titanium white is particularly preferred.

An amount of the pigment (D) is in the range of 3 to 50 parts by weight, preferably 10 to 30 parts by weight per 100 parts by weight of the resin solid content in the resin dispersion (A). When less than 3 parts by weight, a barrier effect on ultraviolet light, heat, etc. may be little, and a stress relaxation power may extremely be weak. Use of more than 50 parts by weight reduces elongation of the releasable film, causes the releasable film to be torn to pieces on releasing, increases water absorption properties of the releasable film, and may cause the releasable film to develop blisters due to rain or the like.

The composition of the present invention may be prepared, for example, by mixing the resin dispersion (A) with the release assistant (B), and optionally with the weather-resistant assistant (C) and the pigment (D) in the form an aqueous emulsion in advance. The aqueous emulsification of the components (B) to (D) may be carried out by a method of using a mechanical means, a method of using an emulsifier, or the like. The composition of the present invention, if needed, may also contain known coating surface adjuster, anti-foaming agent, thickening agent, and the like.

The present invention also provides a method of temporarily protecting a finished coating film on an automobile body, which method comprises the above releasable aqueous coating composition onto a surface of a finished cured coating film coated onto the automobile body.

The finished cured coating film, onto which the releasable aqueous coating composition is coated, in the present invention may include ones obtained by coating a known curing type coating composition onto the automobile body, followed by curing under desirable temperature and time conditions, and preferably may include a coating film having a glass transition temperature controlled in the range of 50° to 130° C. The curing type coating composition may include clear coating compositions, metallic coating compositions containing a metallic pigment such as alminium powder, mica-like powder, mica-like powder coated with titanium oxide or the like, and, if needed, a color pigment, solid color coating compositions containing a color pigment, and the like. Kinds of the curing type coating composition may include aqueous ones, organic solvent ones, powder ones and the like. A curing type resin composition constituting the curing type coating composition may preferably include ones consisting of a base resin such as acrylic resin, polyester resin, alkyd resin, fluorocarbon resin, silicone resin, epoxy resin or the like and a crosslinking agent such as amino resin, polyisocyanate compound, polycarboxylic acid compound, polyepoxy compound or the like, polymers containing a self-curing monomer such as N-butoxymethyl acrylamide as a monomer component, and the like, acrylic resin based, aminoalkyd resin based or urethane resin based coaitng film being particularly preferred. The curing type coating composition may optionally contain extender pigments, various additives and the like. The above cured coating film may include once prepared by coating the above curing type coating composition onto a substrate such as metal, plastic and inorganic material, directly or, if needed, through a primer, intercoat, basecoat or the like, followed by curing under such conditions that the glass transition temperature of the cured coating film may be within the above range.

When the glass transition temperature of the cured coating film is lower than 50° C., the releasable film may show poor releasability due to a long time outdoor exposure, or film defects such as release mark, stain, hazy gloss and the like may develop on the cured coating film after releasing. On the other hand, when the glass transition temperature of the cured coating film is higher than 130° C., the releasable film may spontaneously be released due to its poor adhesive properties during storage. The glass transition temperature of the cured coating film is one determined by applying a free cured coating film (width 5 mm, length 20 mm, thickness 30 μm) to DYNAMIC VISCOELASTOMETER MODEL VIBRON DPV-II-EA, made by TOYO BALDWIN Co., Ltd. for measuring.

The releasable aqueous coating composition obtained, if needed, as above in the present invention is desirably coated onto the finished coating film on the automobile body under the control of a solid content of 30 to 60% by weight, a viscosity of 0.3 to 4.0 Pa·s, preferably 0.7 to 3.0 Pa·s and a surface tension of 40 mN/m or less, preferably 35 mN/m or less. When the solid content is outside the range of 30 to 60% by weight, a crack-like abnormal film appearance may undesirably develop.

When the above viscosity is less than 0.3 Pa·s, the coated composition may easily sag. On the other hand, when more than 4.0 Pa·s, the resulting releasable film surface may show poor smoothness and sharp unevenness, and, in the case of roller coating and brushing, troubles such as poor rotation may be caused, resulting in seriously reducing coating workability. Control of the above viscosity range may easily be carried out by adding a viscoelasticity selected from sodium polyacrylate, acrylic alkyl ester methacrylic acid copolymer, polyacrylic sulfonate, polyether series such as polyoxyalkylene alkyl phenyl ether, urethanemodified polyether series, ethylene-bis-aliphatic carboxylic acid amide, hydroxyethyl cellulose and the like to the above releasable aqueous coating composition.

When the above surface tension is more than 40 mN/m, good wetting properties to the finished coating film on the automobile body may not be obtained, and poor wetting properties such as cissing make it difficult to form a continuous releasable film. The above control of the surface tension may be carried out by adding a water-soluble wetting agent, for example, a polyether-modified silicone oil such as dimethylpolysiloxane modified by ethylene oxide or propylene oxide, a fluorocarbon based surface active agent such as perfluoroalkyl carboxylate, perfluoroalkyl phosphate, perfluoroalkyl amine oxide or the like, or the like to the releasable aqueous coating composition.

A method of coating the above coating composition onto the finished coating film on the automobile body in the present invention may include conventionally used coating methods such as brushing, roller coating, spray coating and the like.

The coated releasable film may be dried at room temperature for 1 or 2 hours, and when heated, for example, at 50° C. for 20 minutes, or at 70° C. for 10 minutes to such a dried state that even exposure to rain immediately after drying may not cause melting and falling down of the coated releasable film. Drying also may be carried out by irradiating medium infrared rays or far infrared rays for 30 seconds or one minute, followed by heating at a surrounding temperature of 50° to 70° C. for 2 to 3 minutes to shorten a drying time. Film thickness of the releasable film may suitably be in the range of 5 to 200 µm as a dry thickness.

The formation of the temporarily protecting film onto the finished coating film on the automobile body may be carried out between a coating step and an assembly step, or may be carried out onto a finished automobile after the assembly step in the automobile manufacturing process.

The former protecting film-forming method is a method which comprises coating the releasable aqueous coating composition after the coating step of the automobile body and before the assembly step in the automobile manufacturing process onto a surface of a finished cured coating film coated on the automobile body during the coating step to form a releasable film, followed by a step of drying the releasable film in a hot-air oven, or by a step of predrying in an infrared oven and then drying in a hot-air oven.

The latter protecting film-forming method is a method which comprises washing a surface of a finished cured coating film coated on a body of a finished automobile with water, followed by hydro-extracting, coating the releasable aqueous coating composition onto the surface of the finished cured coating film to form a releasable film, irradiating infrared rays onto the releasable film for drying, and by hot-air drying the releasable aqueous film.

Figure 2:
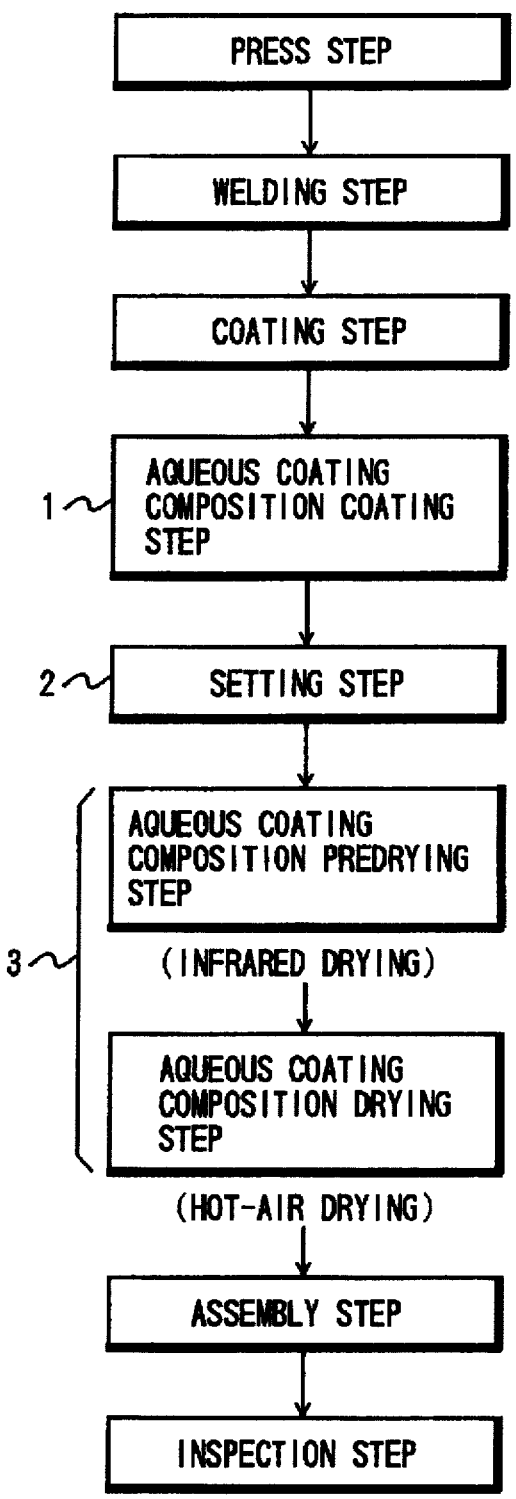

The protecting film formation according to the former method consists of a releasable aqueous coating composition coating step 1, a setting step 2 and a drying step 3 as shown in FIGS. 1 and 2, and the drying step 3 may consist of a hot-air drying only as shown in FIG. 1, or may consist of predrying by infrared rays irradiation and hot-air drying as shown in FIG. 2.

The coating step 1 of the releasable aqueous coating composition may be carried out according to the above mentioned coating method, in which environmental conditions in a coating booth are such that a booth temperature is 15° C. or higher, preferably 20° to 30° C., a wind velocity is 0.1 to 0.3 m/s, and humidity is 50 to 80% from the standpoint of obtaining a good, continuous film without damaging film-forming properties of the aqueous coating composition.

The automobile body, on which the releasable film has been formed, is left to stand for one to 10 minutes in a setting step 2. Environmental conditions in a setting booth are selected in the same manner as those in the coating booth.

In a drying step 3 of the releasable film, the releasable film is dried in a hot-air oven, or is predried in an infrared oven and then dried in a hot-air oven. Drying conditions in the case of the hot-air drying only are suitably in the range of 60° to 160° C., preferably 70° to 120° C., and 10 to 30 minutes.

Predrying in the infrared oven is desirable from the standpoint of drying through interior of the film and preventing an abnormal film appearance. Infrared rays irradiation conditions are such that the use of a far infrared rays heater having a peak of a radiation energy intensity at a wavelength of one A m or more, preferably 2 to 4 µm is effective, and an irradiation time (drying time) is suitably in the range of 90 seconds or shorter, preferably 30 to 60 seconds. The use of a near infrared rays heater having a peak of the radiation energy intensity at a radiation wave length of around one µm results in very easily increasing a surface temperature of the automobile body, making difficult the control of the surface temperature, and in easily developing foams due to bumping of water contained in the releasable film. On the other hand, the use of an ultra infrared rays heater radiating broad infrared rays having a radiation wave length of 3 to several tens µm results in making slow evaporation of water contained in the releasable film.

Conditions of the hot-air drying after predrying are such that drying is suitably carried out at such a temperature that the surface temperature of the automobile body is in the range of 60° to 160° C., preferably 70° to 120° C. for one to 10 minutes. Accordingly, predrying in the infrared oven makes it possible to greatly save time.

In an assembly step, an engine and functional parts are assembled into the body protected by the releasable film to form a finished automobile, followed by being subjected to an inspection step as such.

Figure 3:
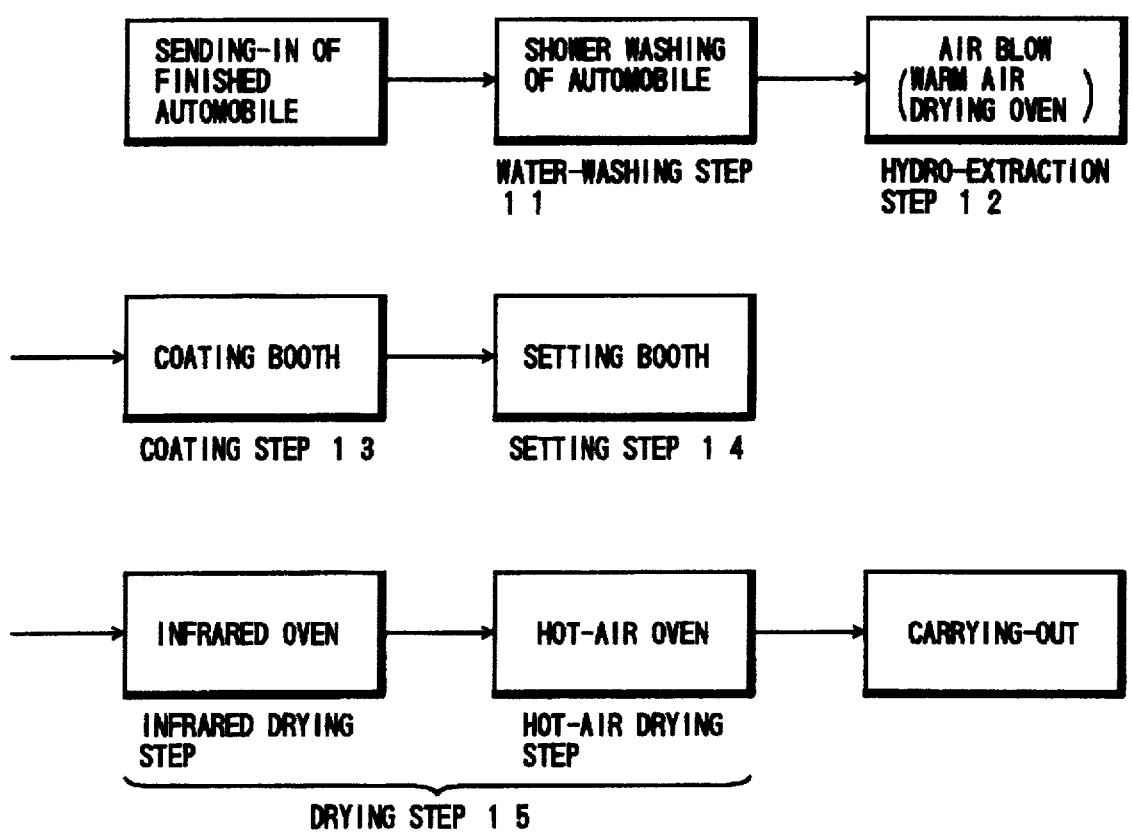

Next, the latter protecting film-forming method consists of a water-washing step 11, a hydro-extraction step 12, a releasable aqueous coating composition-coating step 13, a setting step 14 and a drying step 15 as shown in FIG. 3.

In the water-washing step 11, the finished automobile, on which the protecting film is to be formed, is washed with water so as to remove remaining rain water and dust, which have been adhered onto the surface of the finished cured coating film coated on the body. The water-washing may generally be carried out by use of a shower type automobile washing apparatus, and during the low temperature winter season, a surface temperature of the automobile may suitably be controlled by use of a warm water at 30° to 50° C.

In the hydro-extraction step 12, a washing water, which has adhered onto the surface of the finished cured coating film of the automobile washed with water, is removed, resulting in making it possible to provide good coating workability and finish properties in the following coating step. The hydro-extraction may generally be carried out by air-blow, or further by completely drying by hot air after air-blow. A surface temperature of the automobile is suitably in the range of 15° C. or higher, preferably 20° to 30° C. so as to obtain a good, continuous protecting film without damaging the film-forming properties of the releasable aqueous coating composition.

Therefore, during the low temperature winter season, air-blow by use of hot air at 50°–70° C. and a combination thereof with the washing with warm water make it possible to desirably control the surface temperature of the automobile to provide good coating workability and finished properties in the following coating step.

A releasable aqueous coating composition-coating step 13 and a setting step 14 may be carried out under the same conditions as in the coating step 1 and setting step 2 in the former protecting film-forming method respectively.

A drying step 15 consists of an infrared drying step of infrared-drying the releasable aqueous film formed in the coating step in an infrared oven, and a following hot-air drying step of hot-air-drying in a hot-air oven. Drying by irradiation of infrared rays may be carried out under the same conditions as in the drying step 3 of the former protecting film-forming method.

From the standpoints of protection of various electrical parts and plastic parts, which have been assembled in the automobile, and of shortening drying time, conditions of hot-air drying after the infrared drying are suitably such that a surface temperature of a metal mass constituting the automobile is in the range of 50° to 80° C., preferably 60° to 70° C., and a wind velocity in the oven near the surface of the protecting film is suitably in the range of 0.5 to 3 m/s.

EXAMPLE

The present invention will be explained more in detail by the following Examples and Comparative Examples, in which "part" and "%" mean by weight respectively.

Preparation of Resin Dispersion (A)

Preparation Example 1

A 2-liter four-necked flask was charged with 232 parts of deionized water and 2.3 parts of Newcol 707SF [Nippon Nyukazai Co., Ltd., trade name, anionic surfactant, solid content: 30%], followed by purging with nitrogen, and keeping at 80° C. Thereafter, 0.7 part of ammonium persulfate was added, 15 minutes after followed by dropping a preemulsion prepared by emulsifying the following composition over 3 hours.

|  |  |
| --- | --- |
| deionized water | 338 parts |
| diacetone acrylamide | 32 parts |
| acrylic acid | 3.2 parts |
| styrene | 65 parts |
| methyl methacrylate | 210 parts |
| ethyl acrylate | 174 parts |
| n-butyl acrylate | 158 parts |
| Newcol 707SF | 62 parts |
| ammonium persulfate | 1.2 parts |

Thirty minutes after the completion of dropping, 7.7 parts of a solution prepared by dissolving 0.7 part of ammonium persulfate into 7 parts of deionized water was added over 30 minutes, followed by keeping at 80° C. for 2 hours, lowering the temperature at 45° C. Thereafter, 29.9 parts of a solution prepared by dissolving 4.9 parts of adipic acid dihydrazide into 25 parts of deionized water was added, followed by controlling pH at 8.5 with ammonia water to obtain a crosslinkable resin dispersion (1) having a solid content of 50.7%.

Preparation Example 2

A 2-liter four-necked flask was charged with 242 parts of deionized water and 2.4 parts of Newcol 707SF, followed by purging with nitrogen, and keeping at 80° C. Thereafter, 0.7 part of ammonium persulfate was added, 15 minutes after followed by dropping a preemulsion prepared by emulsifying the following composition over 3 hours.

|  |  |
| --- | --- |
| deionized water | 352 parts |
| diacetone acrylamide | 20.1 parts |
| acrylic acid | 6.7 parts |
| styrene | 67 parts |
| methyl methacrylate | 281 parts |
| n-butyl acrylate | 295 parts |
| Newcol 707SF | 64.5 parts |
| ammonium persulfate | 1.3 parts |

Thirty minutes after the completion of dropping, 7.7 parts of a solution prepared by dissolving 0.7 part of ammonium persulfate into 7 parts of deionized water was added over 30 minutes, followed by keeping at 80° C. for 2 hours, lowering the temperature at 45° C. Thereafter, 41.8 parts of a solution prepared by dissolving 7.8 parts of adipic acid dihydrazide into 34 parts of disionized water was added, followed by controlling pH at 8.5 with ammonia water to obtain a crosslinkable resin dispersion (2) having a solid content of 50.7%.

Preparation Example 3

A 2-liter four-necked flask was charged with 273 parts of deionized water and 0.27 part of RHODAPEX CO-436 (anionic surfactant, solid content: 60%, trade name, marketed by Rhone-Poulene S.A.), followed by purging with nitrogen, and keeping at 80° C. Thereafter, 34 parts of a preemulsion prepared by emulsifying the following composition and 0.35 part of ammonium persulfate were added, 20 minutes thereafter followed by dropping the remaining preemulsion over 4 hours.

|  |  |
| --- | --- |
| deionized water | 328 parts |
| diacetone acrylanide | 45 parts |
| acrylic acid | 1.9 parts |
| n-butyl methacrylate | 534 parts |
| n-butyl acrylate | 60 parts |
| sodium sulfoethyl methacrylate | 1.3 parts |
| RHODAPEX CO-436 | 8 parts |
| ammonium persulfate | 0.6 part |

Completion of the above dropping was followed by keeping at 80° C. for 2 hours, and by lowering the temperature at 45° C. Thereafter, 71.6 parts of a solution prepared by dissolving 11.6 parts of adipic acid dihydrazide into 60 parts of deionized water was added, followed by controlling pH at 8.5 with ammonia water to obtain a crosslinkable resin dispersion (3) having a solid content of 49.8%.

Preparation Example 4

A 2-liter four-necked flask was charged with 273 parts of deionized water and 0.27 part of RHODAPEX CO-436

(anionic surfactant, solid content: 60%, trade name, marketed by Rhone-Poulene S.A.), followed by purging with nitrogen, and keeping at 80° C. Thereafter, 34 parts of a preemulsion prepared by emulsifying the following composition and 0.35 part of ammonium persulfate were added, 20 minutes thereafter followed by dropping the remaining preemulsion over 4 hours.

| deionized water | 328 parts |
| diacetone acrylanide | 32 parts |
| acrylic acid | 1.9 parts |
| n-butyl methacrylate | 128.4 parts |
| ethyl acrylate | 154.2 parts |
| n-butyl acrylate | 115.6 parts |
| methyl methacrylate | 210.1 parts |
| RHODAPEX CO-436 | 8 parts |
| ammonium persulfate | 0.6 part |

Completion of the above dropping was followed by keeping at 80° C. for 2 hours, and by lowering the temperature at 45° C. Thereafter, 29.9 parts of a solution prepared by dissolving 4.9 parts of adipic acid dihydrazide into 25 parts of deionized water was added, followed by controlling pH at 8.5 with ammonia water to obtain a crosslinkable resin dispersion (4) having a solid content of 50.9%.

Preparation Example 5

A 2-liter four-necked flask was charged with 242 parts of deionized water and 2.4 part of Newcol 707SF, followed by purging with nitrogen, and keeping at 80° C. Thereafter, 0.7 parts of ammonium persulfate was added, 15 minutes after followed by dropping a preemulsion prepared by emulsifying the following composition over 3 hours.

| deionized water | 352 parts |
| Newcol 707SF | 62.5 parts |
| methyl methacrylate | 310 parts |
| ethyl acrylate | 180 parts |
| n-butyl acrylate | 172.7 parts |
| acrylic acid | 6.7 parts |
| ammonium persulfate | 1.3 parts |

Thirty minutes after the completion of dropping, 7.7 parts of a solution prepared by dissolving 0.7 part of ammonium persulfate into 7 parts of deionized water was added over 30 minutes, followed by keeping at 80° C. for 2 hours, lowering the temperature at 45° C., and by controlling pH at 8 to obtain a non-crosslinkable resin dispersion (5) having a solid content of 50.8%.

Preparation of Release Assistant (B)

Such ones as impossible to be directly incorporated into the resin dispersion (A) may be incorporated thereinto after forming an aqueous dispersion by use of a surface active agent as follows.

Preparation Example of Wax Emulsion

Respective glass vessels were charged with 20 parts of paraffin wax (MP 46° C.), montan wax and Hi-Mic-1080 (Trade name, marketed by Nippon Sairo Co., Ltd., microcrystalline wax) respectively, followed by adding one part of sorbitan monostearate, 3 parts of polyoxyethylene stearyl ether and 76 parts of water to the above respective vessels, heating at 80° to 90° C. with agitation to obtain respective wax emulsions having a solid content of 20%.

Preparation Example of Silicone Oil Emulsion

To 30 parts of modified silicone oil TSF4445 (Marketed by Toshiba Silicone Co., Ltd., polyether-modified silicone oil) were added 2 parts of polyoxyethylene sorbitan monooleate and 68 parts of water, followed by thoroughly stirring to obtain a silicone oil emulsion having a solid content of 30%.

Preparation of Weather-Resistant Assistant (C)

An ultraviolet light absorber CYASORB UV531 (2-hydroxy-4-n-octoxybenzophenone, trade name, marketed by Cyanamid Co., Ltd.) was dissolved in methyl methacrylate, followed by adding on preparing the resin dispersion (A).

To 30 parts of an ultraviolet light absorber TINUVIN 1130 (marketed by Ciba Geigy A.G., Trade name, Liquid, Benzotriazole derivative) were added 5 parts of polyoxyethylene sorbitan monooleate and 65 parts of water, followed by thoroughly stirring to obtain an ultraviolet light absorber emulsion having a solid content of 30%.

SANDZ PT-21D (Aqueous benzotriazole dispersion, marketed by SANDZ, trade name), which is marketed as an aqueous ultraviolet light absorber dispersion, was directly added.

To 50 parts of a light stabilizer SANOL LS-292 (Hindered amine derivative, liquid, trade name marketed by Sankyo Co., Ltd.) were added 5 parts of polyoxyethylene sorbitan monooleate and 45 parts of water, followed by thoroughly stirring to obtain a light stabilizer emulsion having a solid content of 50%.

Preparation of Pigment (D)

To 560 part of Titanium White R-700 (rutile-type titanium white, trade name, marketed by Du Pont de Nemours & Co.) were added 12 parts of 40% aqueous sodium polycarboxylate solution and 160 parts of water with through agitation, followed by dispersing in a sand mill dispersion mixer so as to be a particle size of 10 μm or less to obtain an aqueous dispersion of titanium white.

Examples 1–25 and Comparative Examples 1–10

To respective 100 parts of the above crosslinkable resin dispersions (1)–(4) and non-crosslinkable resin dispersion (5) as solid contents were added the release assistants prepared as above, ultraviolet light absorbers, light stabilizers and pigments in kinds and amounts (solid contents) as shown in Tables 1 and 2, followed by mixing with agitation to obtain respective releasable aqueous coating composition.

To the above compositions, when needed, were added polyoxyalkylene alkylphenyl ether, perfluoroalkylamine oxide, etc., so as to control viscosity and surface tension as shown in Tables 1 and 2, followed by spray coating the resulting compositions onto the coated panels, a cured coating film of which has a glass transition temperature of 82° C., prepared by coating and curing the aminoalkyd resin coating composition (Marketed by Kansai Paint Co., Ltd., Trade name: AMILAC) at 140° C. for 30 minutes onto the 0.7 mm thick mild steel sheets surface-treated with PAL-BOND 3050 (Trade name, zinc phosphate based surface-treating agent, Marketed by Nihon Parkerrizing Co., Ltd.), followed by drying at 70° C. for 10 minutes to form a releasable coating film having a film thickness of 50 to 70 μm respectively. Performance test results of the releasable films are shown in Tables 1 and 2.

TABLE 1

| | Examples | | | | | | | |
|---|---|---|---|---|---|---|---|---|
| | 1 | 2 | 3 | 4 | 5 | 6 | 7 | 8 |
| Formulation | | | | | | | | |
| Resin dispersion | | | | | | | | |
| kind | (1) | (1) | (1) | (1) | (1) | (2) | (2) | (2) |
| amount (part) | 100 | 100 | 100 | 100 | 100 | 100 | 100 | 100 |
| **Release assistant (*1)** | | | | | | | | |
| kind | TSF 4445 | TSF 4445 | TSF 4445 | TSF 4445 | paraffin wax | montan wax | microcrystalline wax | TSF 4445 |
| amount (part) | 2 | 2 | 2 | 2 | 5 | 3 | 5 | 2 |
| Ultraviolet light absorber/light stabilizer | | | | | | | | |
| kind | — | UV531/— | TINUVIN 1130/— | —/SANOL LS-292 | SANDZ PT-21D/SANOL LS-292 | — | — | TINUVIN 1130/SANOL LS-292 |
| amount (part) | — | 1/— | 1/— | —/0.5 | 1/1 | — | — | 1/0.5 |
| Pigment | | | | | | | | |
| kind | — | — | — | titanium white R-700 | — | — | titanium white R-700 carbon black | titanium white R-700 |
| amount (part) | — | — | — | 15 | — | — | 20/0.1 | 15 |
| Viscosity (Pa·s) (*2) | 0.7 | 0.9 | 0.7 | 1.5 | 1.2 | 0.5 | 0.8 | 2.2 |
| Surface tension (mN/m) (*3) | 34 | 30 | 31 | 30 | 26 | 28 | 34 | 28 |
| Film forming properties (*4) | 3 | 3 | 3 | 3 | 3 | 3 | 3 | 3 |
| Roller coating workability (*5) | 3 | 3 | 3 | 3 | 3 | 3 | 3 | 3 |
| Releasability | | | | | | | | |
| Initial period (*6) | 6 | 6 | 6 | 6 | 6 | 6 | 6 | 6 |
| Heat resistance (*7) | 5 | 5 | 5 | 5 | 6 | 5 | 5 | 6 |
| Accelerated weather resistance (*8) | 5 | 5 | 6 | 6 | 6 | 5 | 6 | 6 |
| Accelerate weather resistance (*9) (Coated product appearance changes with time) | 3 | 3 | 3 | 3 | 3 | 3 | 3 | 3 |
| Protecting Properties | | | | | | | | |
| Acid resistance (*10) | 3 | 3 | 3 | 3 | 3 | 3 | 3 | 3 |
| Iron powder spreading properties (*11) | 3 | 3 | 3 | 3 | 3 | 3 | 3 | 3 |
| Film strength (kgf/cm$^2$) (*12) | 4 (140 or more) | 4 (140 or more) | 4 (140 or more) | 4 (140 or more) | 4 (140 or more) | 4 (140 or more) | 4 (140 or more) | 4 (140 or more) |
| Film elongation (%) (*13) | 4 (300 or more) | 4 (300 or more) | 4 (300 or more) | 4 (300 or more) | 4 (300 or more) | 4 (300 or more) | 4 (300 or more) | 4 (300 or more) |

| | Examples | | | | | | | |
|---|---|---|---|---|---|---|---|---|
| | 9 | 10 | 11 | 12 | 13 | 14 | 15 | 16 |
| Formulation | | | | | | | | |
| Resin dispersion | | | | | | | | |
| kind | (2) | (2) | (2) | (2) | (1) | (1) | (1) | (2) |
| amount (part) | 100 | 100 | 100 | 100 | 100 | 100 | 100 | 100 |
| **Release assistant (*1)** | | | | | | | | |
| kind | TSF 4445 | montan wax | montan wax | SH 204 | TSF 4445 | TSF 4445 | TSF 4445 | montan wax |
| amount (part) | 4 | 3 | 5 | 2 | 2 | 2 | 2 | 4 |
| Ultraviolet light absorber/light stabilizer | | | | | | | | |
| kind | SANDZ PT-21D/SANOL LS-292 | — | SANDZ PT-21D/SANOL LS-292 | UV531/SANOL LS-292 | TINUVIN 1130/— | — | — | TINUVIN 1130/SANOL LS-292 |
| amount (part) | 1/0.5 | — | 1/1 | 1/1 | 1/— | — | — | 1/0.5 |
| Pigment | | | | | | | | |
| kind | titanium white R-700 | titanium/clay white R-700 | — | — | titanium white R-700 | — | — | — |

TABLE 1-continued

|  |  |  |  |  |  |  |  |  |
|---|---|---|---|---|---|---|---|---|
| amount (part) | 15 | 12/5 | — | — | 15 | — | — | — |
| Viscosity (Pa · s) (*2) | 1.8 | 1.0 | 1.0 | 0.9 | 0.2 | 1.5 | 4.5 | 1.2 |
| Surface tension (mN/m) (*3) | 27 | 32 | 30 | 28 | 30 | 42 | 27 | 45 |
| Film forming properties (*4) | 3 | 3 | 3 | 3 | 3 | 3 | 3 | 3 |
| Roller coating workability (*5) | 3 | 3 | 3 | 3 | 1 (Sagging developed) | 1 (poor wetting) | 1 (Bad roller rotation) | 1 (poor wetting) |
| Releasability | | | | | | | | |
| Initial period (*6) | 6 | 6 | 6 | 6 | 6 | 6 | 6 | 6 |
| Heat resistance (*7) | 6 | 5 | 6 | 5 | 5 | 5 | 5 | 6 |
| Accelerated weather resistance (*8) | 6 | 6 | 6 | 6 | 6 | 5 | 5 | 6 |
| Accelerate weather resistance (*9) (Coated product appearance changes with time) | 3 | 3 | 3 | 3 | 3 | 3 | 3 | 3 |
| Protecting Properties | | | | | | | | |
| Acid resistance (*10) | 3 | 3 | 3 | 3 | 3 | 3 | 3 | 3 |
| Iron powder spreading properties (*11) | 3 | 3 | 3 | 3 | 3 | 3 | 3 | 3 |
| Film strength (kgf/cm$^2$) (*12) | 4 (140 or more) | 4 (140 or more) | 4 (140 or more) | 4 (140 or more) | 4 (140 or more) | 4 (140 or more) | 4 (140 or more) | 4 (140 or more) |
| Film elongation (%) (*13) | 4 (300 or more) | 4 (300 or more) | 4 (300 or more) | 4 (300 or more) | 4 (300 or more) | 4 (300 or more) | 4 (300 or more) | 4 (300 or more) |

| | Examples | | | | | | | | |
|---|---|---|---|---|---|---|---|---|---|
| | 17 | 18 | 19 | 20 | 21 | 22 | 23 | 24 | 25 |
| Formulation | | | | | | | | | |
| Resin dispersion | | | | | | | | | |
| kind | (3) | (3) | (3) | (3) | (3) | (4) | (4) | (4) | (4) |
| amount (part) | 100 | 100 | 100 | 100 | 100 | 100 | 100 | 100 | 100 |
| Release assistant | | | | | | | | | |
| (*1) | | | | | | | | | |
| kind | TSF 4445 | TSF 4445 | TSF 4445 | montan wax | montan wax | montain wax | TSF 4445 | TSF 4445 | montan wax |
| amount (part) | 3 | 2 | 2 | 5 | 3 | 5 | 3 | 3 | 3 |
| Ultraviolet light absorber/light stabilizer | | | | | | | | | |
| kind | — | SANDZ PT-21D/ LS-292 | SANDZ PT-21D/ LS-292 | TINUVIN 1130/ LS-292 | TINUVIN 1130/ LS-292 | — | SANDZ PT-21D/— | SANDZ PT-21D/ LS-292 | TINUVIN 1130/ LS-292 |
| amount (part) | — | 1.0/0.5 | 1.0/0.5 | 1.0/0.5 | 1.0/0.5 | — | 1.0/— | 1.0/0.5 | 1.0/0.5 |
| Pigment | | | | | | | | | |
| kind | — | — | titanium white R-700 | — | — | — | titanium white R-700/ carbon black | titanium white R-700 | — |
| amount (part) | — | — | 15 | — | — | — | 20/0.1 | 15 | — |
| Viscosity (Pa · s) (*2) | 1.5 | 2.0 | 2.1 | 2.1 | 2.1 | 2.1 | 2.1 | 2.1 | 2.1 |
| Surface tension (mN/m) (*3) | 30 | 32 | 28 | 34 | 34 | 34 | 34 | 34 | 34 |
| Film forming properties (*4) | 3 | 3 | 3 | 3 | 3 | 3 | 3 | 3 | 3 |
| Roller coating workability (*5) | 3 | 3 | 3 | 3 | 3 | 3 | 3 | 3 | 3 |
| Releasability | | | | | | | | | |
| Initial period (*6) | 6 | 6 | 6 | 6 | 6 | 6 | 6 | 6 | 6 |
| Heat resistance (*7) | 5 | 6 | 6 | 5 | 5 | 5 | 5 | 5 | 5 |
| Accelerated weather resistance (*8) | 5 | 5 | 5 | 5 | 5 | 5 | 5 | 5 | 5 |
| Accelerate weather resistance (*9) (Coated product appearance changes with time) | 3 | 3 | 3 | 3 | 3 | 3 | 3 | 3 | 3 |
| Protecting Properties | | | | | | | | | |
| Acid resistance | 3 | 3 | 3 | 3 | 3 | 3 | 3 | 3 | 3 |

TABLE 1-continued

|  |  |  |  |  |  |  |  |  |  |
|---|---|---|---|---|---|---|---|---|---|
| (*10) |  |  |  |  |  |  |  |  |  |
| Iron powder spreading properties (*11) | 3 | 3 | 3 | 3 | 3 | 3 | 3 | 3 | 3 |
| Film strength (kgf/cm$^2$) (*12) | 4 (140 or more) | 4 (140 or more) | 4 (140 or more) | 4 (140 or more) | 4 (140 or more) | 4 (140 or more) | 4 (140 or more) | 4 (140 or more) | 4 (140 or more) |
| Film elongation (%) (*13) | 4 (300 or more) | 4 (300 or more) | 4 (300 or more) | 4 (300 or more) | 4 (300 or more) | 4 (300 or more) | 4 (300 or more) | 4 (300 or more) | 4 300 or more |

TABLE 2

|  | Comparative Examples | | | | | |
|---|---|---|---|---|---|---|
|  | 1 | 2 | 3 | 4 | 5 | 6 |
| Formulation | | | | | | |
| *Resin dispersion* | | | | | | |
| kind | (1) | (1) | (2) | (5) | (5) | (5) |
| amount (part) | 100 | 100 | 100 | 100 | 100 | 100 |
| *Release assistant (*1)* | | | | | | |
| kind | — | — | — | montan wax | TSF 4445 | — |
| amount (part) | — | — | — | 3 | 2 | — |
| *Ultraviolet light absorber/ light stabilizer* | | | | | | |
| kind | — | SANDZ PT-21D/ SANOL LS-292 | — | TINUVIN 1130 | SANDZ PT-21D/ SANOL LS-292 | TINUVIN 1130 |
| amount (part) | — | 1/0.5 | — | 1/— | 1/0.5 | 1/— |
| *Pigment* | | | | | | |
| kind | — | — | titanium white R-700/ carbon black | — | — | titanium white R-700 |
| amount (part) | — | — | 15/0.1 | — | — | 15 |
| Viscosity (Pa · s) (*2) | 0.9 | 1.2 | 0.8 | 1.3 | 0.8 | 1.0 |
| Surface tension (mN/m) (*3) | 30 | 28 | 31 | 30 | 28 | 28 |
| Film forming properties (*4) | 3 | 3 | 3 | 3 | 3 | 3 |
| Roller coating workability (*5) | 3 | 3 | 3 | 3 | 3 | 3 |
| *Releasability* | | | | | | |
| Initial period (*6) | 6 | 6 | 6 | 6 | 6 | 6 |
| Heat resistance (*7) | 3 (heavy) | 3 (heavy) | 3 (heavy) | 6 | 6 | 3 (heavy) |
| Accelerated weather resistance (*8) | 1 (unreasable) | 3 (heavy) | 1 (unreasable) | 5 | 6 | 1 (unreasable) |
| Accelerate weather resistance (*9) (Coated product appearance changes with time) | unmeasured | 3 | unmeasured | 3 | 3 | unmeasured |
| *Protecting Properties* | | | | | | |
| Acid resistance (*10) | 3 | 3 | 3 | 3 | 3 | 3 |
| Iron powder spreading properties (*11) | 3 | 3 | 3 | 3 | 3 | 3 |
| Film strength (kgf/cm$^2$) (*12) | 4 (140 or more) | 4 (140 or more) | 4 (140 or more) | 2 (60–100) | 2 (60–100) | 2 (60–100) |
| Film elongation (%) (*13) | 4 (300 or more) | 4 (300 or more) | 4 (300 or more) | 4 (300 or more) | 4 (300 or more) | 4 (300 or more) |

|  | Comparative Examples | | | |
|---|---|---|---|---|
|  | 7 | 8 | 9 | 10 |
| Formulation | | | | |
| *Resin dispersion* | | | | |
| kind | (3) | (3) | (5) | (5) |

TABLE 2-continued

| | | | | |
|---|---|---|---|---|
| amount (part) | 100 | 100 | 100 | 100 |
| Release assistant (*1) | | | | |
| kind | — | — | TSF 4445 | TSF 4445 |
| amount (part) | — | — | 3 | 3 |
| Ultraviolet light absorber/ light stabilizer | | | | |
| kind | — | TINUVIN 1130/ LS-292 | — | SANDZ PT-21D/ LS-292 |
| amount (part) | — | 1.0/0.5 | — | 1.0/0.5 |
| Pigment | | | | |
| kind | — | titanium white R-700 | — | titanium white R-700 |
| amount (part) | — | 15 | — | 15 |
| Viscosity (Pa · s) (*2) | 1.8 | 2.1 | 1.6 | 2.4 |
| Surface tension (mN/m) (*3) | 29 | 34 | 32 | 29 |
| Film forming properties (*4) | 3 | 3 | 3 | 3 |
| Roller coating workability (*5) | 3 | 3 | 3 | 3 |
| Releasability | | | | |
| Initial period (*6) | 6 | 6 | 6 | 6 |
| Heat resistance (*7) | 3 | 3 | 5 | 5 |
| Accelerated weather resistance (*8) | 1 | 3 | 5 | 5 |
| Accelerate weather resistance (*9) (Coated product appearance changes with time) | unmeasured | 3 | 3 | 3 |
| Protecting Properties | | | | |
| Acid resistance (*10) | 3 | 3 | 3 | 3 |
| Iron powder spreading properties (*11) | 3 | 3 | 3 | 3 |
| Film strength (kgf/cm$^2$) (*12) | 4 (140 or more) | 4 (140 or more) | 2 (60–100) | 2 (60–100) |
| Film elongation (%) (*13) | 4 (300 or more) | 4 (300 or more) | 4 (300 or more) | 4 (300 or more) |

ROLLER B, Trade name, Marketed by Otsuka Brush Manufacturing Co., Ltd.) having a fiber thickness of 13 mm and a width of 180 mm and made of an woolen fiber to investigate wetting properties and sagging properties of the coating compositions and rotating conditions of the roller.
(Wetting Properties)

3: Nothing abnormal. Cissing showing poor wetting properties is not observed.

2: Cissing showing poor wetting properties is observed in the range of 50% or less of the surface.

1: Poor wetting properties is shown all over the surface, resulting in making it impossible to form a continuous film.
(Sagging Properties)

Immediately after roller coating, a test panel was kept at an angle of slope of 60 degree to observe sagging properties.

3: No sagging is observed.

2: Sagging develops in the range of half or less of the width of the coating.

1: Sagging develops all over the width of the coating.
(Rotating Conditions of Roller)

3: Nothing abnormal. The roller normally rotates to form a continuous releasable film.

2: Rotating conditions are not so good, and slipping partly takes place to form a thin film.

1: Rotating conditions are bad, and it is impossible to keep predetermined film thickness due to slipping.

(*6) Releasability (Initial period):

Formation of a releasable film was followed by leaving to stand at 20° C. for one day, and peeling off the releasable film coated on the test panel starting from its edge portion at a speed of 1 m/30 sec. to examine releasability.

6: Very easily releasable.
5: Easily releasable.
4: Not so heavy.
3: Heavy but releasable.
2: The releasable film is brittle and difficult to be released in the shape of a sheet.
1: Unreleasable.

(*7) Releasability (Heat Resistance):

The test panel was left to stand at 80° C. for 300 hours to examine releasability in the same manner as in (*6)

(*8) Releasability (Accelerated Weathering Resistance):

In accordance with QUV Accelerated Exposure Test by use of an accelerated weathering resistance testing machine, marketed by Q PANEL Co., Ltd., testing was carried out under conditions of ultraviolet light irradiation of 16H/70° C. and water condensation of 8H/50° C. as one cycle for 480 hours (20 cycles), followed by examining releasability in the same manner as in (*6).

(*9) Accelerated Weathering Resistance
(Appearance Changes of Finished Coating Film)

After peeling off the releasable film as in the above test (*8), the surface of the aminoalkyd coating film as the finished coating film was examined to see abnormalities such as swelling.

3: Nothing abnormal.
2: Light swelling is observed.
1: Serious swelling is observed.

(*10) Protecting Properties (Acid Resistance):

Onto the releasable film was spotted 0.4 ml of 40% sulfuric acid, followed by heating at 60° C. for 15 minutes, washing with water, and peeling off the releasable film to observe swelling, gloss deterioration and etching marks on the amino-alkyd coating film.

3: Nothing abnormal.
2: Swelling is observed.
1: Gloss deterioration and etching marks are observed.

(*11) Protecting Properties (Iron Powder Spreading Properties):

Iron powder was sprinkled all over the releasable film through a 20 mesh screen, followed by heating at 80° C. for one hour, subjecting to a salt spray test at 35° C. for 48 hours, and peeling off the releasable film to examine spreading of the iron powder to the aminoalkyd coating film.

3: Nothing abnormal.
2: Spreading of iron is observed in the range of 30% or less of the coating film surface.
1: Spreading of iron is observed in the range of more than 30% of the coating film surface.

(*12 & *13) Film Strength and Elongation:

Measurements were made by use of an Instron tensile strength tester (Autograph marketed by SHIMADZU CORPORATION) under the conditions of a temperature of 20° C., a stress rate of 50 mm/min. and a loading of 5 kg·G.

Film Strength:
4: 140 kgf/cm² or more
3: 100 kgf/cm² or more, but less than 140 kgf/cm²
2: 60 kgf/cm² or more, but less than 100 kgf/cm²
1: less than 60 kgf/cm²

Film Elongation:
4: 300% or more
3: 200% or more, but less than 300%
2: 100% or more, but less than 200%
1: less than 100%

Examples 26–34 and Comparative Examples 11–19

To releasable aqueous coating compositions of Examples 17–25 and Comparative Examples 5, 7–10 were added, if needed, polyoxyalkylene alkylphenyl ether and perfluoroalkylamine oxide, followed by controlling viscosity, surface tension as shown in Tables 3–6, and controlling solid content with water as shown in Tables 3–6, coating the resulting releasable aqueous coating compositions to be a dry film thickness of 60 to 80 μm by a pressure feed type roller coating using WOO ROLLER B (Trade name, marketed by Otsuka Brush Manufacturing Co., Ltd.) as a roller cover under an atmosphere of 20° C. and 70% RH onto a cured coating film of a coated panel prepared by coating an acrylic-melamine resin based topcoating composition (marketed by Kansai Paint Co., Ltd., trade name, MAGICRON) onto a 0.7 mm thick mild steel sheets surface-treated with PALBOND 3050 (Trade name, zinc phosphate based surface-treating agent, Marketed by Nihon Parkerrizing Co., Ltd.) and by curing at 140° C. for 30 minutes, setting for 2 minutes under the atmosphere of 20° C. and 70% RH, irradiating infrared rays by use of a transparent quartz-sheathed element heater (marketed by HERAEUS Co., Ltd.) for 60 seconds, and drying in a hot-air oven at 70° C. for 3 minutes to form releasable films respectively. Performance test results of the releasable films are shown in Tables 3 and 4.

TABLE 3

| | Examples | | | | | | | | |
|---|---|---|---|---|---|---|---|---|---|
| | 26 | 27 | 28 | 29 | 30 | 31 | 32 | 33 | 34 |
| Releasable aqueous coating composition (kind) | Example 17 | Example 18 | Example 19 | Example 20 | Example 21 | Example 22 | Example 23 | Example 24 | Example 25 |
| Solid content (%) | 48.2 | 48.7 | 51.3 | 49.5 | 38.9 | 41.3 | 53.6 | 52.5 | 49.7 |
| Viscosity (Pa · s) (*2) | 1.5 | 2.0 | 2.1 | 2.1 | 2.1 | 2.1 | 2.1 | 2.1 | 2.1 |
| Surface tension (mN/m) (*3) | 30 | 32 | 28 | 34 | 34 | 34 | 34 | 34 | 34 |
| Wetting properties (*14) | 3 | 3 | 3 | 3 | 3 | 3 | 3 | 3 | 3 |
| Sagging properties (*15) | 3 | 3 | 3 | 3 | 3 | 3 | 3 | 3 | 3 |
| Cracking properties (*16) | 3 | 3 | 3 | 3 | 3 | 3 | 3 | 3 | 3 |
| Releasability (Accelerated weathering resistance) (*17) | | | | | | | | | |
| Test temperature 5° C. | 5 | 5 | 5 | 5 | 5 | 5 | 5 | 5 | 5 |
| Test temperature 20° C. | 5 | 6 | 6 | 6 | 6 | 5 | 6 | 6 | 6 |
| Test temperature 50° C. | 5 | 5 | 5 | 5 | 5 | 5 | 5 | 5 | 5 |
| Film strength (*18) | | | | | | | | | |
| Test temperature 5° C. | 4 (250 or more) | 4 (250 or more) | 4 (250 or more) | 4 (250 or more) | 4 (250 or more) | 4 (250 or more) | 4 (250 or more) | 4 (250 or more) | 4 (250 or more) |
| Test temperature 20° C. | 4 (140 or more) | 4 (140 or more) | 4 (140 or more) | 4 (140 or more) | 4 (140 or more) | 4 (140 or more) | 4 (140 or more) | 4 (140 or more) | 4 (140 or more) |
| Test temperature 50° C. | 3 (100) or more) | 3 (100) or more) | 3 (100) or more) | 3 (100) or more) | 3 (100) or more) | 3 (100) or more) | 3 (100) or more) | 3 (100) or more) | 3 (100) or more) |
| Film elongation (*19) | | | | | | | | | |
| Test temperature 5° C. | 4 (110) | 4 (122) | 4 (105) | 4 (102) | 4 (110) | 4 (118) | 4 (100) | 4 (112) | 4 (108) |
| Test temperature 20° C. | 5 (350) | 5 (340) | 5 (310) | 5 (375) | 5 (330) | 5 (390) | 5 (335) | 5 (350) | 5 (380) |
| Test temperature 50° C. | 5 (340) | 5 (350) | 5 (280) | 5 (320) | 5 (290) | 5 (385) | 5 (360) | 5 (380) | 5 (420) |

TABLE 4

|  | Comparative Examples | | | | | | | | |
|---|---|---|---|---|---|---|---|---|---|
|  | 11 | 12 | 13 | 14 | 15 | 16 | 17 | 18 | 19 |
| Releasable aqueous coating composition (kind) | Example 18 | Example 18 | Comparative Ex. 7 | Comparative Ex. 8 | Example 18 | Example 19 | Comparative Ex. 9 | Comparative Ex. 10 | Comparative Ex. 5 |
| Solid content (%) | 47.6 | 48.5 | 50.1 | 52.1 | 25.5 | 28.6 | 49.1 | 50.5 | 47.9 |
| Viscosity (Pa · s) (*2) | 0.28 | 2.1 | 1.8 | 2.1 | 4.0 | 2.1 | 1.6 | 2.4 | 0.25 |
| Surface tension (mN/m) (*3) | 31 | 45 | 29 | 34 | 32 | 30 | 32 | 29 | 34 |
| Wetting properties (*14) | 3 | 1 | 3 | 3 | 3 | 3 | 3 | 3 | 3 |
| Sagging properties (*15) | 1 | 3 | 3 | 3 | 3 | 3 | 3 | 3 | 1 |
| Cracking properties (*16) | 1 | 3 | 3 | 3 | 1 | 1 | 3 | 3 | 1 |
| Releasability (Accelerated weathering resistance) (*17) | | | | | | | | | |
| Test temperature 5° C. | 5 | 5 | 1 | 4 | 5 | 5 | 3 | 3 | 3 |
| Test temperature 20° C. | 6 | 6 | 1 | 4 | 6 | 6 | 6 | 6 | 6 |
| Test temperature 50° C. | 5 | 5 | 1 | 1 | 5 | 5 | 2 | 2 | 2 |
| Film strength (*18) | | | | | | | | | |
| Test temperature 5° C. | 4 (250 or more) | 4 (250 or more) | 4 (250 or more) | 4 (250 or more) | 4 (250 or more) | 4 (250 or more) | 4 (250 or more) | 4 (250 or more) | 4 (250 or more) |
| Test temperature 20° C. | 4 (140 or more) | 4 (140 or more) | 4 (140 or more) | 4 (140 or more) | 4 (140 or more) | 4 (140 or more) | 3 (100 or more) | 3 (100 or more) | 3 (100 or more) |
| Test temperature 50° C. | 3 (100 or more) | 3 (100 or more) | 3 (100 or more) | 3 (100 or more) | 3 (100 or more) | 3 (100 or more) | 1 (60 or less) | 1 (60 or less) | 1 (60 or less) |
| Film elongation (*19) | | | | | | | | | |
| Test temperature 5° C. | 4 (115) | 4 (112) | 4 (108) | 4 (102) | 4 (115) | 4 (112) | 1 (50 or less) | 1 (50 or less) | 1 (50 or less) |
| Test temperature 20° C. | 5 (340) | 5 (335) | 5 (395) | 5 (375) | 5 (380) | 5 (410) | 5 (380) | 5 (420) | 5 (435) |
| Test temperature 50° C. | 5 (370) | 5 (340) | 5 (320) | 5 (320) | 5 (420) | 5 (400) | 2 (1000 or more) | 2 (1000 or more) | 2 (1000 or more) |

Examples 35–43 and Comparative Examples 20–28

To releasable aqueous coating compositions of Examples 17–25 and Comparative Examples 5, 7–10 were added, if needed, polyoxyalkylene alkylphenyl ether and perfluoroalkylamine oxide, followed by controlling viscosity, surface tension as shown in Tables 3–6, and controlling solid content with water as shown in Tables 3–6, coating the resulting releasable aqueous coating compositions to be a dry film thickness of 60 to 80 μm by a pressure feed type roller coating using WOO ROLLER B (Trade name, marketed by Otsuka Brush Manufacturing Co., Ltd.) as a roller cover under an atmosphere of 20° C. and 70% RH onto a cured coating film of a coated panel prepared by coating an acrylic-melamine resin based topcoating composition (marketed by Kansai Paint Co., Ltd., trade name, MAGICRON) onto a 0.7 mm thick mild steel sheets surface-treated with PALBOND 3050 (Trade name, zinc phosphate based surface-treating agent, Marketed by Nihon Parkerrizing Co., Ltd.) and by curing at 140° C. for 30 minutes, after the cured coating film has been washed with water and then subjected to hydro-extraction by air blow at 60° C., setting for 2 minutes under the atmosphere of 20° C. and 70% RH, irradiating infrared rays by use of a transparent quartz-sheathed element heater (marketed by HERAEUS Co., Ltd.) for 60 seconds, and drying in a hot-air oven at 70° C. for 3 minutes to form releasable films respectively. Performance test results of the releasable films are shown in Tables 5 and 6.

TABLE 5

|  | Examples | | | | | | | | |
|---|---|---|---|---|---|---|---|---|---|
|  | 35 | 36 | 37 | 38 | 39 | 40 | 41 | 42 | 43 |
| Releasable aqueous coating composition (kind) | Example 17 | Example 18 | Example 19 | Example 20 | Example 21 | Example 22 | Example 23 | Example 24 | Example 25 |
| Solid content (%) | 48.9 | 48.5 | 52.0 | 49.3 | 39.5 | 42.6 | 52.8 | 51.3 | 50.1 |
| Viscosity (Pa · s) (*2) | 1.5 | 2.0 | 2.1 | 1.3 | 3.5 | 2.2 | 2.4 | 2.0 | 1.2 |
| Surface tension (mN/m) (*3) | 30 | 32 | 28 | 31 | 34 | 35 | 29 | 32 | 34 |
| Wetting properties (*14) | 3 | 3 | 3 | 3 | 3 | 3 | 3 | 3 | 3 |
| Sagging properties (*15) | 3 | 3 | 3 | 3 | 3 | 3 | 3 | 3 | 3 |
| Cracking properties (*16) | 3 | 3 | 3 | 3 | 3 | 3 | 3 | 3 | 3 |
| Releasability (Accelerated weathering | | | | | | | | | |

TABLE 5-continued

|  | Examples | | | | | | | | |
|---|---|---|---|---|---|---|---|---|---|
|  | 35 | 36 | 37 | 38 | 39 | 40 | 41 | 42 | 43 |
| resistance) (*17) | | | | | | | | | |
| Test temperature 5° C. | 5 | 5 | 5 | 5 | 5 | 5 | 5 | 5 | 5 |
| Test temperature 20° C. | 5 | 6 | 6 | 6 | 6 | 5 | 6 | 6 | 6 |
| Test temperature 50° C. | 5 | 5 | 5 | 5 | 5 | 5 | 5 | 5 | 5 |
| Film strength (*18) | | | | | | | | | |
| Test temperature 5° C. | 4 (250 or more) | 4 (250 or more) | 4 (250 or more) | 4 (250 or more) | 4 (250 or more) | 4 (250 or more) | 4 (250 or more) | 4 (250 or more) | 4 (250 or more) |
| Test temperature 20° C. | 4 (140 or more) | 4 (140 or more) | 4 (140 or more) | 4 (140 or more) | 4 (140 or more) | 4 (140 or more) | 4 (140 or more) | 4 (140 or more) | 4 (140 or more) |
| Test temperature 50° C. | 3 (100 or more) | 3 (100 or more) | 3 (100 or more) | 3 (100 or more) | 3 (100 or more) | 3 (100 or more) | 3 (100 or more) | 3 (100 or more) | 3 (100 or more) |
| Film elongation (*19) | | | | | | | | | |
| Test temperature 5° C. | 4 (110) | 4 (122) | 4 (105) | 4 (102) | 4 (110) | 4 (118) | 4 (100) | 4 (112) | 4 (108) |
| Test temperature 20° C. | 5 (350) | 5 (340) | 5 (310) | 5 (375) | 5 (330) | 5 (390) | 5 (335) | 5 (350) | 5 (380) |
| Test temperature 50° C. | 5 (340) | 5 (350) | 5 (280) | 5 (320) | 5 (290) | 5 (385) | 5 (360) | 5 (380) | 5 (420) |

TABLE 6

|  | Comparative Examples | | | | | | | | |
|---|---|---|---|---|---|---|---|---|---|
|  | 20 | 21 | 22 | 23 | 24 | 25 | 26 | 27 | 28 |
| Releasable aqueous coating composition (kind) | Example 18 | Example 18 | Comparative Ex. 7 | Comparative Ex. 8 | Example 18 | Example 19 | Comparative Ex. 9 | Comparative Ex. 10 | Comparative Ex. 5 |
| Solid content (%) | 48.1 | 49.1 | 49.9 | 52.3 | 27.3 | 28.8 | 49.3 | 50.8 | 48.2 |
| Viscosity (Pa · s) (*2) | 0.28 | 2.1 | 1.8 | 2.1 | 4.0 | 2.1 | 1.6 | 2.4 | 0.25 |
| Surface tension (mN/m) (*3) | 31 | 45 | 29 | 34 | 32 | 30 | 32 | 29 | 34 |
| Wetting properties (*14) | 3 | 1 | 3 | 3 | 3 | 3 | 3 | 3 | 3 |
| Sagging properties (*15) | 1 | 3 | 3 | 3 | 3 | 3 | 3 | 3 | 1 |
| Cracking properties (*16) | 1 | 3 | 3 | 3 | 1 | 1 | 3 | 3 | 1 |
| Releasability (Accelerated weathering resistance) (*17) | | | | | | | | | |
| Test temperature 5° C. | 5 | 5 | 1 | 4 | 5 | 5 | 3 | 3 | 3 |
| Test temperature 20° C. | 6 | 6 | 1 | 4 | 6 | 6 | 6 | 6 | 6 |
| Test temperature 50° C. | 5 | 5 | 1 | 1 | 5 | 5 | 2 | 2 | 2 |
| Film strength (*18) | | | | | | | | | |
| Test temperature 5° C. | 4 (250 or more) | 4 (250 or more) | 4 (250 or more) | 4 (250 or more) | 4 (250 or more) | 4 (250 or more) | 4 (250 or more) | 4 (250 or more) | 4 (250 or more) |
| Test temperature 20° C. | 4 (140 or more) | 4 (140 or more) | 4 (140 or more) | 4 (140 or more) | 4 (140 or more) | 4 (140 or more) | 3 (100 or more) | 3 (100 or more) | 3 (100 or more) |
| Test temperature 50° C. | 3 (100 or more) | 3 (100 or more) | 3 (100 or more) | 3 (100 or more) | 3 (100 or more) | 3 (100 or more) | 1 (60 or less) | 1 (60 or less) | 1 (60 or less) |
| Film elongation (*19) | | | | | | | | | |
| Test temperature 5° C. | 4 (115) | 4 (112) | 4 (108) | 4 (102) | 4 (115) | 4 (112) | 1 (50 or less) | 1 (50 or less) | 1 (50 or less) |
| Test temperature 20° C. | 5 (340) | 5 (335) | 5 (395) | 5 (375) | 5 (380) | 5 (410) | 5 (330) | 5 (420) | 5 (435) |
| Test temperature 50° C. | 5 (370) | 5 (340) | 5 (320) | 5 (320) | 5 (420) | 5 (400) | 2 (1000 or more) | 2 (1000 or more) | 2 (1000 or more) |

Performance Test Methods:

An aqueous coating composition was coated by a pressure feed type roller coater to examine wetting properties, sagging properties and cracking properties after drying.

(*14) Wetting Properties:

3: Nothing abnormal. Cissing showing poor wetting properties is not observed.

2: Cissing showing poor wetting properties is observed in the range of 50% or less of the surface.

1: Poor wetting properties is shown all over the surface.

(*15) Sagging Properties:

Immediately after roller coating, a test panel was kept at an angle of slope of 45 degree to observe sagging properties.

3: No sagging is observed.

2: Sagging develops in the range of half or less of the width of the coating.

1: Sagging develops all over the width of the coating.

(*16) Cracking Properties:

Development of crack-like abnormality on the coated surface of the protecting film after drying was examined to be evaluated as follows.

3: No development of crack-like abnormality on the coated surface was observed to be good.

2: Development of crack-like abnormality on the coated surface was observed in the range of 50% or less of the coated surface.

1: Development of crack-like abnormality on the coated surface was observed all over the coated surface.

(*17) Releasability (Accelerated Weathering Resistance):

In accordance with QUV Accelerated Exposure Test by use of an accelerated weathering resistance testing machine, marketed by Q PANEL Co., Ltd., testing was carried out under conditions of ultraviolet light irradiation of 16H/70° C. and water condensation of 8H/50° C. as one cycle for 480 hours (20 cycles), followed by peeling off by hand the releasable film coated on the test panel starting from its edge portion at a speed of 1 m/30 sec. and at 5° C., 20° C. and 50° C. to evaluate releasability as follows respectively.

6: Very easily releasable.

5: Easily releasable.

4: Heavy, but releasable in the shape of a sheet.

3: The releasable film is brittle to be cracked and impossible to be released in the shape of a sheet.

2: Elongation of the releasable film is so high as to be easily torn to pieces and to be impossible to be released in the shape of a sheet.

1: Unreleasable.

(*18, *19) Film Strength and Elongation:

Measurements were made by use of an Instron tensile strength tester (Autograph marketed by SHIMADZU CORPORATION) under the conditions of temperatures of 5° C. 20° C. and 50° C., a stress rate of 50 mm/min. and a loading of 5 kg-G.

Film Strength:

4: 140 kgf/cm² or more

3: 100 kgf/cm² or more, but less than 140 kgf/cm²

2: 60 kgf/cm² or more, but less than 100 kgf/cm²

1: less than 60 kgf/cm²

Film Elongation:

5: 300% or more, but less than 1000%.

4: 100% or more, but less than 300%.

3: 50% or more, but less than 100%.

2: 1000% or more.

1: less than 50%.

Effect of the Invention

The method of temporarily protecting finished coating film on the automobile body comprises coating a liquid aqueous coating composition, resulting in being applicable to complicated shapes of the automobile. The releasable film formed according to the method of the present invention is stable against light, heat and the like, shows excellent releasability from the finished coating film on the automobile body with time and shows excellent protecting function against pollution due to suspended matters and droppings in air, resulting in making it possible to maintain the commercial values of the finished coating film on the automobile body for a long period of time, and in making it possible to easily release the releasable film by hands or high pressure water stream prior to passing into the possession of users of the coat-finished automobile. Incineration of the released film does not generate any harmful gas such as hydrogen cyanide gas or the like without raising any environmental problems.

Industrial Applicability

The coating composition of the present invention is useful for temporarily protecting a finished coating film on an automobile body and surfaces of other coated products.

We claim:

1. A releasable aqueous coating composition containing (A) a resin dispersion containing a carbonyl group-containing copolymer aqueous dispersion, which contains, as a monomer component, a carbonyl group-containing α,β-ethylenically unsaturated monomer (a) and a polyhydrazide compound in such a ratio that an amount of hydrazide group is in the range of 0.02 to 3.0 equivalents per one equivalent of carbonyl group in the emulsion particle, and (B) a release assistant consisting of a polyether-modified silicone oil represented by the following formula:

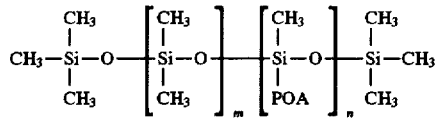

wherein m and n are a positive integer, POA represents polyether moiety due to ethylene oxide or propylene oxide modification, and oriented in a low layer portion of a releasable film formed from the releasable aqueous coating composition.

2. A coating composition as claimed in claim 1, wherein the carbonyl group-containing copolymer aqueous dispersion contains the monomer (a) in an amount of 0.1 to 30 percent by weight based on a monomer composition.

3. A composition as claimed in claim 1, wherein the carbonyl group-containing copolymer aqueous emulsion is prepared by subjecting a monomer mixture consisting of 0.1 to 30% by weight of the carbonyl group-containing α,β-ethylenically unsaturated monomer (a), 0 to 10% by weight of a water-soluble ethylenically unsaturated monomer (b) and 60 to 99.9% by weight of an ethylenically unsaturated monomer (C) other than both monomer (a) and monomer (b) to emulsion polymerization.

4. A coating composition as claimed in claim 3, wherein the release assistant (B) is contained in an amount of 0.01 to 10 parts by weight per 100 parts by weight of the solid content in the resin dispersion (A).

5. A coating composition as claimed in claim 4, wherein said coating composition further contains at least one weather resistant assistant (C) selected from the group consisting of an ultraviolet light absorber and a light stabilizer.

6. A coating composition as claimed in claim 5, wherein a pigment (D) is contained in an amount of 3 to 50 parts by weight per 100 parts by weight of a solid content in the resin dispersion (A).

7. A coating composition as claimed in claim 6, wherein the pigment (D) is titanium white.

8. A method of temporarily protecting a finished coating film on an automobile body, which method comprises coating a releasable aqueous coating composition containing (A) a resin dispersion containing a carbonyl group-containing copolymer aqueous dispersion, which contains, as a monomer component, a carbonyl group-containing α,β-ethylenically unsaturated monomer (a) and a polyhydrazide compound in such a ratio that an amount of hydrazide group is in the range of 0.02 to 3.0 equivalents per one equivalent of carbonyl group in the emulsion particle, and (B) a release assistant consisting of a polyether-modified silicone oil represented by the following formula:

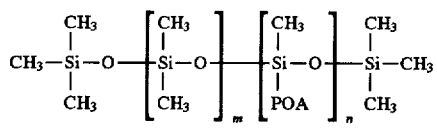

wherein m and n are a positive integer, POA represents polyether moiety due to ethylene oxide or propylene oxide modification, and oriented in a low layer portion of a releasable film formed from the releasable aqueous coating composition, onto a surface of a finished cured coating film coated onto the automobile body.

9. A method as claimed in claim 8, wherein a solid content of the releasable aqueous coating composition is controlled to be in the range of 30 to 60% by weight for coating.

10. A method as claimed in claim 9, wherein a viscosity of the releasable aqueous coating composition is controlled to be in the range of 0.3 to 4.0 Pa·s for coating.

11. A method as claimed in claim 10, wherein a surface tension of the releasable aqueous coating composition is controlled to be in the range of 40 mN/g. or less for coating.

12. A method as claimed in claim 11, wherein a glass transition temperature of the finished cured coating film coated onto the automobile body is in the range of 50° to 130° C.

13. A method as claimed in claim 12, wherein said method further comprises a step of coating a releasable aqueous coating composition containing (A) a resin dispersion containing a carbonyl group-containing copolymer aqueous dispersion and a polyhydrazide compound in such a ratio that an amount of hydrazide group is in the range of 0.02 to 3.0 equivalents per one equivalent of carbonyl group in the emulsion particle, and (B) a release assistant, after the coating step of the automobile body and before the assembly step in the automobile manufacturing process onto a surface of a finished cured coating film coated on the automobile body during the coating step to form a releasable film, followed by a step of drying the releasable film in a hot-air oven, or by a step of predrying in an infrared oven and then drying in a hot-air oven.

14. A method as claimed in claim 12, wherein said method further comprises washing a surface of a finished cured coating film coated on a body of a finished automobile with water, followed by hydro-extracting, coating a releasable aqueous coating composition containing (A) a resin dispersion containing a carbonyl group-containing copolymer aqueous dispersion and a polyhydrazide compound in such a ratio that an amount of hydrazide group is in the range of 0.02 to 3.0 equivalents per one equivalent of carbonyl group in the emulsion particle, and (B) a release assistant, onto the surface of the finished cured coating film to form a releasable film, irradiating infrared rays onto the releasable film for drying, and by hot-air drying the releasable aqueous film.

* * * * *